United States Patent [19]
Schneider

[11] 3,985,636
[45] Oct. 12, 1976

[54] ELECTRODIALYSIS APPARATUS ELECTRODE SYSTEM

[75] Inventor: Burnett M. Schneider, Wind Lake, Wis.

[73] Assignee: Aqua-Chem, Inc., Milwaukee, Wis.

[22] Filed: Sept. 26, 1975

[21] Appl. No.: 617,189

[52] U.S. Cl. .......................... 204/301; 204/180 P; 204/282; 204/286
[51] Int. Cl.² .................................. B01D 13/02
[58] Field of Search ............... 204/301, 180 P, 286, 204/282, 252

[56] References Cited
UNITED STATES PATENTS

| 776,490 | 12/1904 | Briggs | 204/286 |
|---|---|---|---|
| 1,546,908 | 7/1925 | LaPenta | 204/301 X |
| 2,222,979 | 11/1940 | LeMaire | 204/286 X |
| 3,192,143 | 6/1965 | Roe et al. | 204/301 X |
| 3,240,692 | 3/1966 | Donnelly | 204/180 P |
| 3,251,763 | 5/1966 | Carey | 204/286 |
| 3,453,201 | 7/1969 | Mihara et al. | 204/301 |

*Primary Examiner*—John H. Mack
*Assistant Examiner*—A. C. Prescott
*Attorney, Agent, or Firm*—Fred Wiviott

[57] ABSTRACT

An electrode system for use in an electrodialyzer which comprises a plurality of depletion compartments and concentration compartments bounded by ion selective membranes and electrodes in compartments at opposite ends of apparatus. The end compartment electrodes comprise a plurality of elongate members that are each mounted in holders which permit exchanging electrodes in the end compartments or, advancing the electrodes as they are consumed, without requiring that the end compartments be removed to gain access to the electrodes.

26 Claims, 9 Drawing Figures

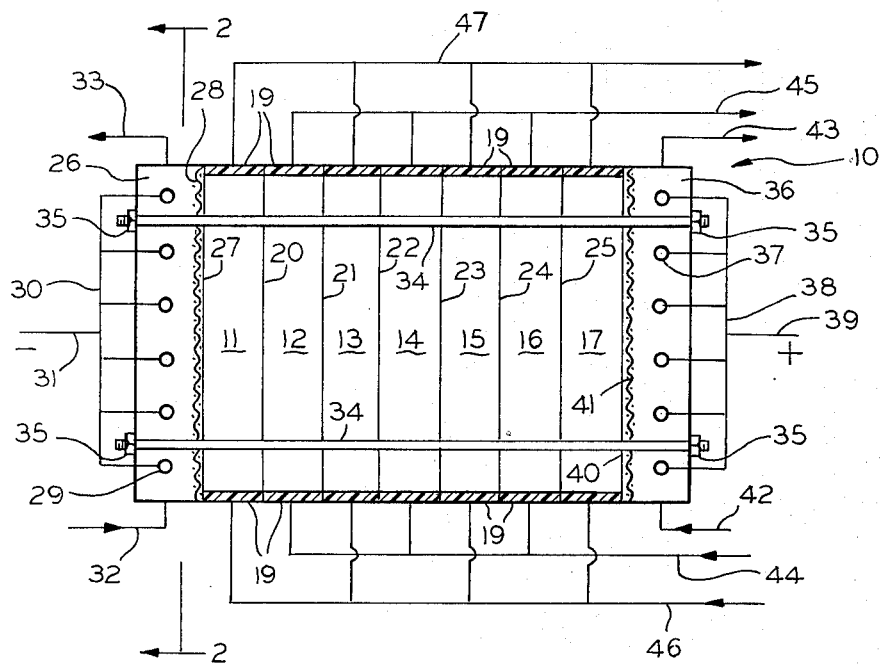
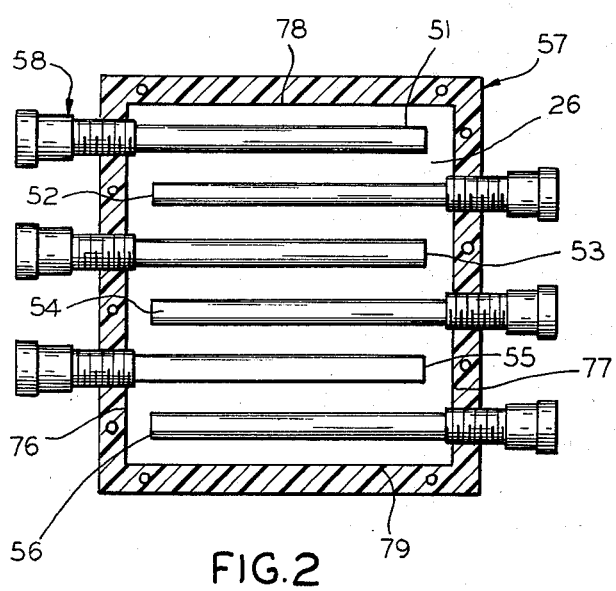
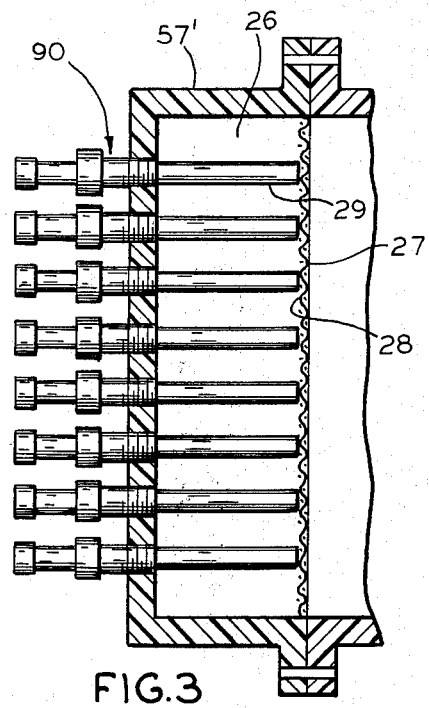

U.S. Patent  Oct 12, 1976  Sheet 2 of 2  3,985,636
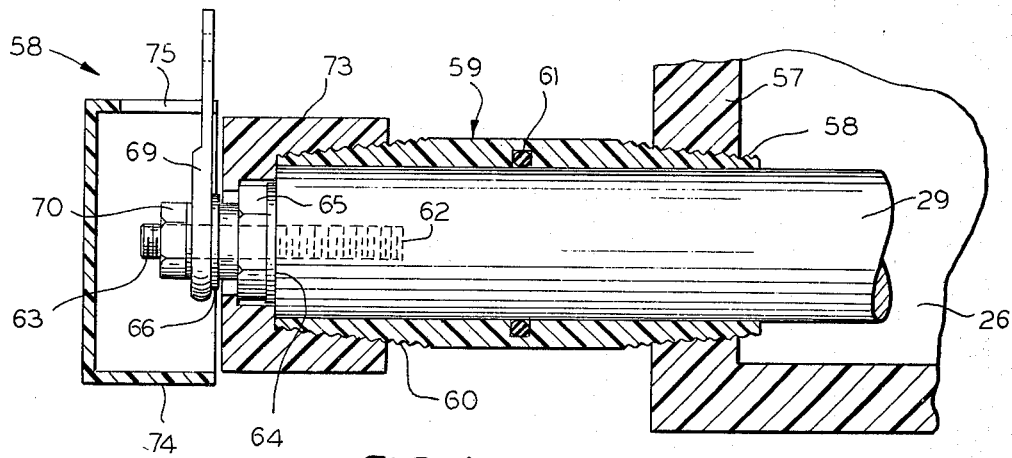
FIG. 4
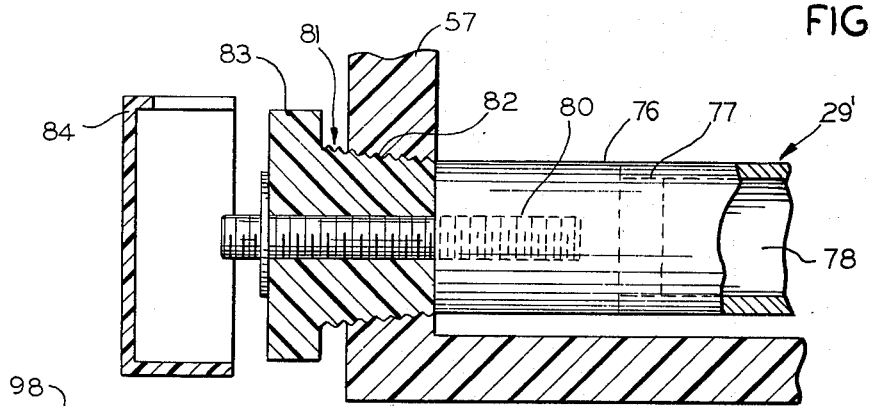
FIG. 5
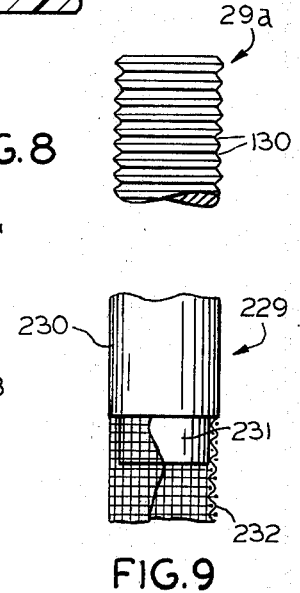
FIG. 8
FIG. 9
FIG. 7
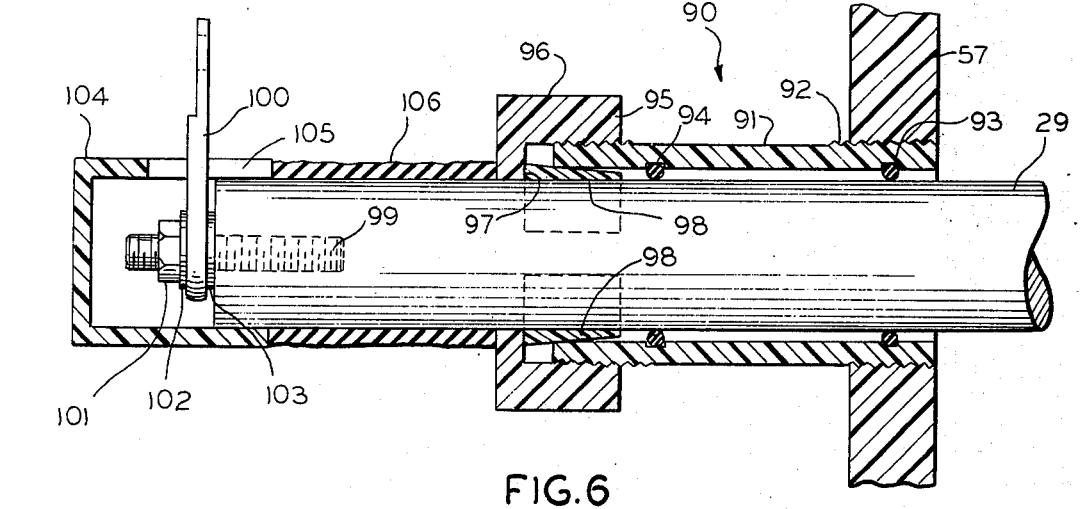
FIG. 6

ELECTRODIALYSIS APPARATUS ELECTRODE SYSTEM

BACKGROUND OF THE INVENTION

This invention relates to improvements in apparatus used for electrodialysis of aqueous solutions containing ionizable inorganic or organic constituents which are to be removed from the solution or suspension. In particular, the improvements are in the electrodes which are situated in the end compartments through which it is the normal practice to circulate anolyte and catholyte solutions in electrodialyzers.

Generally, electrodialysis apparatus comprises a multichamber cell in which depletion chambers and concentrating chambers are arranged in alternating order, which chambers are defined by a plurality of spaced alternatingly arranged membranes at least some of which are selectively permeable to ions. The membranes are mounted between planar gaskets which define the chambers and seal the peripheries of the membranes. A chamber at the end of the cell adjacent one membrane has one or more anodes in it and a chamber at the other end adjacent another membrane, has one or more cathodes in it. The membranes, gaskets and end chambers are arranged in a stack which is secured by means which provide endwise compression. Anolyte and catholyte solutions are usually conducted continuously through the anode and cathode chambers, respectively, during operation of the apparatus. The solution from which ions are to be extracted is flowed through the depletion chamber and the solution in which the ions are to be collected or concentrated is flowed through the concentration chambers. The ions are transferred, depending on their polarity, through the ion selective membranes under the influence of an electric potential applied to the electrodes between which an electric current passes in series across the membranes and the chambers defined between them.

The anodes and cathodes are made of various material such as platinum, stainless steel and carbon. Most frequently, according to prior practice, the electrodes in the end compartments constitute plates which degrade or otherwise erode in time and have to be replaced. In prior art apparatus, this meant that the stack had to be drained and dismantled in order to gain access to the electrodes for replacing them. This is not only an inconvenient procedure but it is time consuming and reduces the productivity of the apparatus.

SUMMARY OF THE INVENTION

A primary object of the invention is to provide electrodialysis apparatus with an electrode system in which electrodes can be installed and exchanged easily without having to disassemble the compartments of the apparatus. Another object is to provide electrodialysis apparatus with an electrode system in which electrodes can be easily advanced to compensate for their erosion and to enable maintaining constant support of a membrane defining an end compartment of electrodialysis apparatus.

In accordance with the invention, a plurality of elongate conductive members are used as electrodes. The compartments in which the electrodes are located are provided with a plurality of sealed holders through which the electrodes extend. The electrodes may take the form of rods, bars or tubes and are inserted through the holders and secured. In one embodiment, the electrodes are generally parallel and juxtaposed to the membranes of the dialyzer and in another embodiment the rod electrodes are normal or generally perpendicular to the planes and bear on a screen which supports a membrane to assist in resisting pressure of fluids flowing in an adjacent compartment.

Although the features of the invention which are believed to be novel will be pointed out in the claims appended hereto, the invention itself, the above-stated objects and other more specific objects and advantages, and the manner in which it may be carried out may be better understood by referring to the drawing and the following description of embodiments of the invention.

BRIEF DESCRIPTION OF THE DRAWING

FIG. 1 is a diagrammatic illustration of an electrodialyzer incorporating electrodes according to the present invention;

FIG. 2 is an end view, looking into an end compartment of a dialyzer, wherein the electrodes are generally parallel to the planes of the membranes thereof, said view may be considered to have been taken on a line corresponding generally with 2—2 in FIG. 1;

FIG. 3 is a view looking into an end compartment of an electrodialyzer in which the electrodes are disposed perpendicularly to the planes of the membranes;

FIG. 4 is a longitudinal sectional view of alternate embodiments of the electrode and the electrode holder;

FIG. 5 is a longitudinal sectional view of another form of electrode holder;

FIG. 6 is a longitudinal sectional view of an electrode holder where the electrode is intended to be disposed with its axis perpendicular to the planes of the membranes in the electrodialyzer;

FIG. 7 is a perspective view of a wedging segment isolated from the preceding FIGURE; and FIGS. 8 and 9 show alternate forms of electrodes that may be employed with the present invention.

DESCRIPTION OF PREFERRED EMBODIMENTS

A typical dialyzer 10 which is shown diagrammatically in FIG. 1 includes compartments 11–17 defined by gaskets or spacers 19 and membranes 20, 22 and 24 and alternately disposed membranes 21, 23 and 25. A typical commercial electrodialyzer usually has more compartments and more membrane groups than appear in the schematic illustration. An end compartment 26 through which catholyte fluid may be circulated is separated from adjacent compartment 11 by a membrane 27 which is backed up by a screen or grille 28 to resist fluid pressure differentials on the membrane. In accordance with the invention, cathode compartment 26 has a plurality of electrodes 29 extending through it. The electrodes are all connected to a common bus 30 which is connected to the negative pole 31 of a dc power supply, not shown. There is an input conduit 32 and an output conduit 33 for the catholyte solution. The assembly is held in endwise compression to seal the peripheries of the gaskets 19 and membranes 21-27 by any suitable means, such as rods 34 and nuts 35.

The other end compartment, namely, the anode compartment 36 also has a plurality of electrodes 37 connected to a common bus 38 which connects to the positive pole 39 of a dc power supply. Anode compartment 36 is also faced with a membrane 40 backed by a screen or grille 41.

Anolyte may be introduced into anode compartment 36 with an inlet pipe 42. After passing through compartment 36, the anolyte exits through conduit 43.

A solution containing charged particles or ions which are to be extracted therefrom is introduced into the depletion compartments 12, 14 and 16 by means of a header 44 which has several branches leading to the respective compartments. This fluid flows through the compartments and exits through a header 45.

A solution for accepting and concentrating ions derived from even numbered compartments is introduced to the odd numbered compartments 11, 13, 15 and 17 through a header 46 and, this fluid after circulating through the compartments, exits through a header 47.

As it is well known, when an electric potential is applied between poles or terminals 31 and 39, an electric field exists between the cathodes and anodes. This causes the anions in the even numbered compartments to be influenced in the direction of the anode as a result of which the anions permeate a membrane on the anode side of their compartment after which they are intercepted in the concentrating streams flowing through the odd numbered compartments. The positive cations, on the other hand, are attracted toward the cathode through membranes bounding the ionizing compartments on the opposite side from the membranes through which the anions pass. The cations are similarly carried away in the concentrating fluid. It will be understood, however, that dialyzers in which the new electrode system may be used are not limited to the type which is diagrammatically shown herein but they may have numbers of compartments, with various kinds of fluids flowing therein and using various kinds of membranes. For example, the assembly may include various combinations of membranes which are anion selective, cation selective or particle size selective.

Because of electrochemical reactions and fluid flow, the electrodes 29 and 37 in the end compartments 26 and 36, respectively, undergo erosion and other degradation and must be replaced occasionally. Heretofore, conductive plates were most commonly used for the anode and cathode electrodes in electrodialyzers. A relatively complete disassembly and relatively long term shutdown of the apparatus resulted when it became necessary to replace the degraded anode and cathode electrodes. The use of electrodes and holders, in accordance with the present invention, overcomes these and other problems.

FIG. 2 is a view looking into one of the flanged end compartments, such as anode and cathode compartments 26 and 36, respectively. Compartment 26 is typical and is occupied by a plurality of conductive electrodes 51–56 which are spaced apart from each other in the vertical direction and may be aligned or staggered horizontally. The exemplary electrodes 51–56 illustrated in FIG. 2 are shown to be in the form of rods which are circular in cross-section although it will be appreciated that they may take the form of tubes or bars and have any convenient cross-sectional configuration such as oval or polygonal. The number of electrodes shown is merely illustrative; the number required will ordinarily depend on the size of the electrodialyzer and the tolerable current density per unit area of the electrodes. Electrode compartment 26 is defined by a housing 57 which is preferably made of an insulating resin or plastic material. Housing 57 has side walls 76 and 77 and top and bottom walls 78 and 79 with a rear wall in the brackground in FIG. 2. The side walls and upper and lower walls form a frame which is closed by the rear wall on one side and has an opening in the forefront. In the dialyzer assembly, the opening is adjacent and sealed against a membrane. As shown, electrodes 51–56 have their axes directed horizontally, but they may be directed veretically as well. Each of the electrode rods is supported in a holder, a typical one of which is designated generally by the refeerence number 58. The rods are juxtaposed to the compartment opening and to a membrane. The conductors for connecting the rod electrodes 51–56 in parallel are not shown in FIG. 2.

FIG. 4 shows one embodiment of an electroode holder, such as 58, in detail. In this construction, housing 57 has an internally threaded hole for receiving the externally threaded end 58 of a tubular member or plastic nipple 59. The other end of the nipple 59 has an external thread 60. The bore of the nipple may be provided with one or more grooves for retaining an o-ring 61 seal. The electrode rod 29 is sized to fit snugly within the bore of nipple 59 so that o-ring 61 can effect a seal against the fluids within compartment 26. Rod electrode 29 has a conductive stud 62, preferably of copper, threaded or otherwise affixed in its end. Stud 62 has an outer threaded end portion 63. A washer 64 is fitted over the stud endwise and bears against the end of rod 29. A nut 65 is threaded onto the stud and another washer 66 is fitted over it. Nut 65 and washer 66 serve as electrical contact means cooperating with a lug 59 by means of which electrical connection can be made to the electrode. A nut 70 holds lug 69 tightly.

Most of the support of rod 29 results from plastic nipple 59 being coextensive with a substantial portion of the length of the rod. Further stability and protection is provided by an internally threaded collar 73 which is made of an insulating and relatively hard plastic material. A cap 74 offers further electrical and mechanical protection. Cap 74 may be made of a relatively soft plastic. It is generally cylindrical but has an axial slot 75 which permits cap 74 to depress onto the exterior of internally threaded collar 73. The exterior dimensions of collar 73 and obtain a press fit between these two components.

If, in the FIG. 4 embodiment, exchange of the rod electrodes 29 is desired, it is only necessary to remove cap 74 by hand, remove nut 70, slide off lug 69, unscrew collar 73 and remove it, and then grasp the threaded end 63 of stud 62 to withdraw rod 29 from nipple 59. Installation of a new rod 29 can be achieved quickly by reversing the steps just outlined.

An alternate embodiment of the electrode holder is illustrated in FIG. 5. Here an alternate form of an electrode is also illustrated, Specifically, the electrode 29' includes a rod-like terminal portion 76 having a reduced diameter end 77 portion. A tubular member 78 is secured on the reduced diameter end portion 77 and has an inside diameter substantially the same as the outside diameter of the said end portion to provide a relatively low-resistance current path therebetween. Terminal portion 76 is provided with a stud 80 extending axially from the other end. Electrode 29' together with stud 80 are supported within the electrode compartment by means of a lug 81 of any suitable material, such as plastic, and having external threads 82 which are received into an internally threaded hole in a wall of the end compartment 57. Plug 81 may have an integral collar 83 to facilitate gripping it and turning it into the hold in compartment wall 57. The assembly may also be provided with a plastic cover 84 which makes a press fit on collar 83. The electrical connecting lug is not shown in FIG. 5.

Removal of an electrode rod 29' in accordance with the FIG. 5 embodiment, involves first removing plastic cover 84. Plastic plug 81 in then unscrewed by gripping its collar 83. Removal of plug 81 results in stud 80 and electrode 29' being carried with it. Then, while holding plug 81, electrode 29' may be turned to separate the plug from stud 80. Plug 81 may then be turned onto stud 80 of a new electrode 29' after which plug 81 may be screwed into its mating threaded hole in compartment housing 57.

The embodiments of the holder just described in reference to FIGS. 4 and 5 are primarily for use where the electrodes are disposed in parallelism with the membrane adjacent an end compartment such as 57. In the FIG. 3 embodiment, an end compartment 57' contains a plurality of electrodes 29 mounted in holders which are generally designated by the reference number 90. In this embodiment, the axes of the electrodes 29 are rod-like and are perpendicular to the plane of the membrane, such as 27, which bounds compartment 26. There is back-up screen or grille 28 which minimizes distension of membrane 27 when it is subject to a pressure differential. It is evident in FIG. 3, that electrode rods 29 may be placed in contact with screen 28 to further support it against pressure. However, as the rods 29 erode, and, in particular, as their ends erode, support for screen 28 is lost. In accordance with the invention, rods 29 can be loosened in their holders 90 and moved axially toward screen 28 to reinstate the support.

An enlargement of a typical holder 90 for the FIG. 3 electrode assembly is shown in FIG. 6. In this embodiment, the holder comprises tubular means or nipple 991 which has an external thread 92 screwed into a suitable hole in the wall of compartment 57. Nipple 91 has a pair of internal grooves for receiving o-rings 93 and 94 which sealingly engage the outer surface of electrode 29 and prevent leakage of fluid from the compartment. Nipple 91 has another external thread 95 for receiving an internally threaded plastic collar 96. Collar 96 has an internal shoulder 97. The collar is used for securing electrode rod 29 in nipples 91 with a wedging action.

The wedging action is obtained with a tapered ferrule segment which is marked 98 in FIG. 6 and shown isolated therefrom in FIG. 7. Two or more ferrule segments 98 may be used. They are made by tapering the exterior of a tube, cutting off the tapered portion and splitting it longitudinally to form several segments. The curvature of the segments or, in other words, the internal radius of the original tube should be substantially equal to the radius of electrode rod 29. The taper and thickness of the segment should be chosen to produce the desired wedging action. As can be seen in FIG. 6, the thicker end of segment 97 is abutted by the shoulder 9 of collar 96 such that when the collar is turned onto thread 95 of nipple 91 the segment will be wedged between electrode rod 29 and the interior of nipple 91, thus holding rod 29 in a stable fashion.

In the FIG. 6 embodiment, as in the preceding embodiments, electrode rod 29 is provided with an endwise extending stud, here marked 99, to which an electrical connector lug 100 may be attached by means of a nut 101 that pressed against washers 102 and 103 which engage lug 100 on opposite faces. A plastic end cap 104 having a slot 105 for clearing lug 100 is also provided. The interior of cap 104 has about the same diameter as the outside of rod 29 so that cap 104 can make a slip fit of the rod. A flexible rubber boot or sleeve 106 is provided for minimizing exposure to conductive parts such as rod 29.

This assembly permits the electrode rods to be advanced into the end compartment as the rod ends erode to thus regain support for the membrane by pressing against its back-up screen. It also makes exchanging rod electrodes easy. To withdraw a rod for exchange, it is only necessary to remove the electrical connection to the stud 99, loosen collar 96 and relieve the wedging action by pulling the rod out of the holder. To advance the rod electrode inwardly of the compartment, it is only necessary to loosen collar 96, draw the rod back far enough to relieve the wedging action, push the rod inwardly and tighten collar 96 again to restore the wedging action.

As is well known, electrodes such as rods 29 used as anodes or cathodes in electrodialyzers may be composed of various materials such as carbon, stainless steel, copper and various metals coated with noble metals. Their composition will usually depend on the electrochemical properties of the anolyte or catholyte which is circulated through the end compartments of the electrodialyzer. Those skilled in the art known how to choose electrodes having proper composition and surface area consistent with current density requirements so these matters require no discussion.

It is to be noted, however, that substantial surface area can be achieved with rod electrodes since they are exposed to fluid all the way around and not only on one face as is characteristic of plate electrodes. The rod electrodes also induce more turbulence in the fluid in which they are bathed, thus tending to remain cleaner.

FIG. 8 shows an alternate embodiment of the present invention wherein the electrode 129 has a surface area defined by a plurality of grooves or corrugations 130. These serve to increase the electrodes surface area and to provide sharper points of definition for the electric field. Yet another embodiment of an electrode is illustrated in FIG. 9. Here the electrode 229 includes a terminal portion 230 having a reduced diameter portion 231 for receiving a tubular screen 232 which forms the active portion of the electrode. The screen 232 will be secured in any suitable manner to the reduced diameter terminal portion 231 such as by soldering.

While only a few embodiments of the invention have been illustrated and described, it is not intended to be limited thereby, but only by the scope of the appended claims.

I claim:
1. Electrodialysis apparatus comprising:
  an anode compartment and a cathode compartment spaced from each other.
  a plurality of ion permeable membrane means spaced from each other between said anode and cathode compartments to define a plurality of enclosed compartments for fluids,
  at least one of said anode and said cathode compartment having a plurality of elongate electrode means extending therein, and
  holder means mounted to said compartment, said holder means supporting each said electrode means and disposing a portion of said electrode means inside of said one compartment, said holder means including means for sealing said electrode means relative to said compartment.

2. The electrodialysis apparatus set forth in claim 1 wherein:
each of said compartments has an opening presented toward the other,
a plurality of gasket means separating said membrane means to define therewith a plurality of alternate compartments for fluids and to enclose said anode and cathode compartment openings, respectively,
each of said electrode means having a portion extending into said one compartment in juxtaposition with a membrane and another portion extending outwardly from said compartment,
a plurality of holder means mounted to said one compartment, each said holder means having an aperture for receiving said electrode means movably therethrough, and
means for sealing said electrode means relative to said holder means when said electrode means are in said aperture.

3. The apparatus as in claim 2 wherein:
said membranes are arranged in generally parallel planes,
said at least one compartment has a first wall means disposed generally normal to the planes of said membranes, and
a group of said holder means are mounted on said wall means to enable said rod electrode means held by said group of holder means to extend into said at least one compartment in substantial parallelism with said membranes.

4. The apparatus as in claim 3 wherein said at least one compartment has another wall generally parallel to the planes of said membranes and opposed to said first wall, another group of said holder means are mounted to said another wall to enable said rod electrode means held by one group of holders to extend into said compartment in an opposite direction from the rod electrode means held by the other of said group of holder means.

5. The electrodialysis apparatus set forth in claim 1 wherein each of said compartments having an opening presented toward the other,
said membrane means including substantially planar membranes that are selectively permeable to ions and spaced from each other and generally parallel to define said plurality of compartments and to enclose said anode and cathode compartment openings,
said electrode means comprising rod electrodes for at least one of said anode and cathode compartments, each of said rod electrode means extending into said at least one compartment generally normal to the planes of said membranes,
each of said holder means having an opening for receiving said rod electrode means movably therethrough, and
means for sealing said rod electrode means relative to said holder means when said electrode means are within said openings.

6. The apparatus as in claim 5 including:
screen means adjacent said membrane means which defines said one compartment for supporting said membrane against pressure imposed thereon,
said rod electrode means being movable a sufficient distance in said at least one compartment to contact and support said screen means.

7. For use with electrodialysis apparatus which includes substantially planar membrane means:
electrode compartments means having rear wall means and side wall means defining an opening for being disposed adjacent one of said membrane means,
a plurality of elongate electrode means extending into said compartment means through a wall thereof,
a plurality of holder means mounted in at least one of said wall means, said holder means each including means defining passageway for receiving an electrode means to dispose a portion thereof within said compartment,
said holder means including sealing means for sealing said electrode means releasably relative to said passageway.

8. The apparatus as in claim 7 wherein:
said holder means are mounted in said side wall means for disposing said electrode means in general parallelism with the plane of a membrane adjacent said opening in said compartment.

9. The apparatus as in claim 7 wherein:
said holder means are mounted in said rear wall means for disposing said electrode means generally normal to the plane of a membrane adjacent said opening in said compartment.

10. The apparatus defined in claim 9 wherein:
said passageway defining means comprise tubular means having a thread at opposite first and second ends, said rear wall means having threaded holes for receiving said first threaded ends of said tubular means,
collar means having an internal thread for engaging said second threaded end of said tubular means, a hole formed therein for said rod electrode means to extend exteriorly of said tubular means and said collar means, and shoulder means surrounding said hole,
wedge means disposed for being urged into wedging relation between said electrode means and said tubular means under the influence of said shoulder means when said collar means is turned to enable said electrode means to be positioned at any desired distance in said compartment, and
stud means extending from an end of said electrode means for permitting an electrical connection to be made therewith.

11. The apparatus in claim 7 wherein:
said passageway defining means comprise tubular means having a thread at opposite first and second ends, said wall means having threaded holes for receiving said first threaded ends of said tubular means,
said sealing means comprise o-ring means disposed in said passageway for engaging said elongate electrode means in sealable and relatively slidable relationship,
said electrode means have stud means extending from an end thereof, and
cap means having a thread for engaging with said second thread of said tubular means and having a hole for said stud means to extend therethrough.

12. The apparatus set forth in claim 7 wherein at least one of said wall means has a plurality of holes,
said electrode means extending in substantial parallelism with each other into said compartment means and each having stud means projecting therefrom at an end opposite from the end in said compartment means, a plurality of electrode holder means each including an element sealingly supported in one of said holes, respectively, and including means sealingly supporting said electrode means.

13. The apparatus as in claim 12 wherein:

said element comprises tubular means engaged in said holes, said stud means extending externally of said tubular means to enable making an electrical connection to said electrode means.

14. The apparatus as in claim 12 wherein;

said holes are internally threaded, said elements comprise plug means having an external threaded engageable in said holes and having an internally threaded hole through which stud means is threaded for extending outside of said lug means to permit an electrical connection to be made to said electrode means.

15. Permeation separation apparatus comprising:

first and second means respectively defining an anode and a cathode support means spaced from each other, a plurality of membrane means spaced from each other between said anode and cathode support means to define a plurality of compartments for fluids, at least some of said membranes being ion permeable, a plurality of elongate electrode means extending through at least one of said anode and cathode support means, holder means mounted to said one support means said holder means removably supporting said electrode means and disposing a portion of said electrode means inside of said one support means, said holder means including means for sealing said electrode means relative to said support means.

16. The apparatus set forth in claim 15 wherein said lectrode means comprises a plurality of elongate rods.

17. The apparatus set forth in claim 15 wherein said one support means defines a recess facing said membrane means, said holder means positioning said electrode means in said recess.

18. The apparatus set forth in claim 17 and including means for circulating fluid through said recess and through at least some of the compartments defined by said membranes.

19. The apparatus set forth in claim 18 wherein said electrode means comprises a plurality of rod electrodes extending into said recess.

20. The apparatus set forth in claim 19 wherein said electrodes extend substantially across said recess in general parallelism with each other.

21. The apparatus set forth in claim 20 wherein said of said anode and cathode support means defines a recess facing the other and including a plurality of electrodes generally parallel to each other, said membrane means being generally planar and being arranged between said recesses, removable coupling means joining said support means and said membranes in a stack.

22. The apparatus set forth in claim 21 wherein said holder means is accessible from the exterior of said support means to permit removal and insertion of said electrodes into their respective recesses without removing said coupling means.

23. The apparatus set forth in claim 22 wherein a second portion of said electrodes extend outwardly of said recesses, and electric terminal means disposed on said second portions.

24. The apparatus set forth in claim 22 wherein at least a portion of the surface of said electrode has a plurality circumferential grooves formed therein.

25. The apparatus set forth in claim 22 wherein at least a portion of said electrodes disposed in said recesses being generally tubular.

26. The apparatus set forth in claim 26 wherein the tubular portion of said electrode is comprised of a screen.

* * * * *

UNITED STATES PATENT OFFICE
CERTIFICATE OF CORRECTION

Patent No. 3,985,636     Dated October 12, 1976

Inventor(s) Burnett M. Schneider

It is certified that error appears in the above-identified patent and that said Letters Patent are hereby corrected as shown below:

Column 8, claim 7, line 12, before "passageway" insert --a--.

Column 9, claim 14, line 15, cancel "threaded" and substitute --thread--.

Column 9, claim 16, line 40, cancel "lectrode" and substitute --electrode--.

Column 10, claim 21, line 15, cancel "said" and substitute --each--.

Signed and Sealed this

Fourteenth Day of December 1976

[SEAL]

Attest:

RUTH C. MASON
*Attesting Officer*

C. MARSHALL DANN
*Commissioner of Patents and Trademarks*